(No Model.)

W. H. & B. H. COLLINS.
WAGON NUT.

No. 507,310. Patented Oct. 24, 1893.

Witnesses
Erie G. Juliber
C. P. Elwell

Inventors
W. H. Collins and B. H. Collins
By Hopkins & Atkins
Attorneys

UNITED STATES PATENT OFFICE.

WILLIE H. COLLINS AND BYRON H. COLLINS, OF EAST RICHFORD, VERMONT.

WAGON-NUT.

SPECIFICATION forming part of Letters Patent No. 507,310, dated October 24, 1893.

Application filed October 17, 1892. Serial No. 449,164. (No model.)

*To all whom it may concern:*

Be it known that we, WILLIE H. COLLINS and BYRON H. COLLINS, of East Richford, county of Franklin, and State of Vermont, have invented a certain new and useful Wagon-Nut, of which the following is a specification, reference being had to the accompanying drawings.

The object of our invention is to produce a device that is adapted to take the place of the ordinary screw nut upon the end of an axle for securing a wheel in place, and which combines greater facility of manipulation and readiness of adjustment with equal stability and efficiency.

Figure 1:
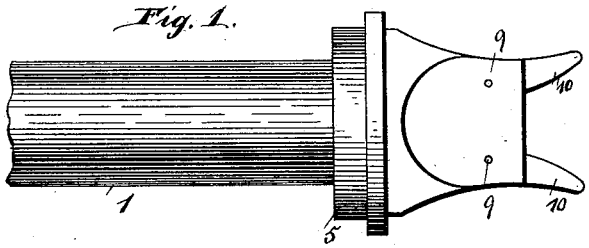
Figure 2:
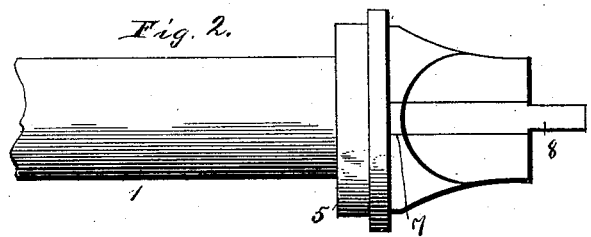
Figure 3:
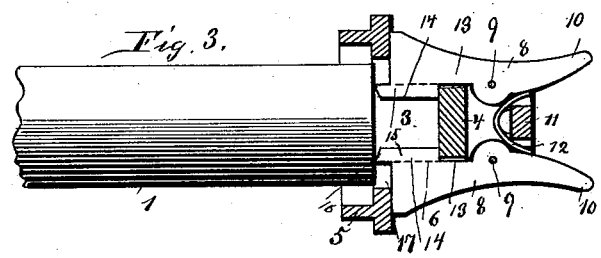
Figure 4:
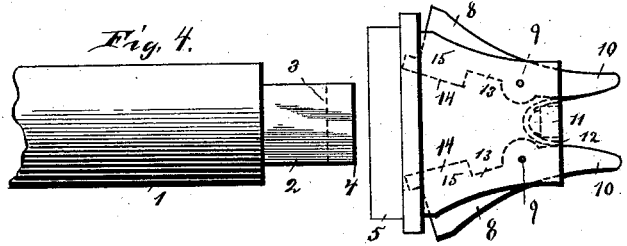

In the accompanying drawings, Figure 1 is a side elevation of a section of axle with our nut attached. Fig. 2 is a similar view, taken at right angles to the first. Fig. 3 is a central longitudinal section of Fig. 1. Fig. 4 is a side elevation of the nut of the axle, and of the nut in juxtaposition, the clips of the nut being shown as spread for the insertion of the axle.

Referring to the figures on the drawings, 1 indicates an ordinary axle spindle, provided on its extremity with a reduced, preferably squared end 2, which is preferably pierced by a mortise-like aperture 3, as illustrated. The extremity of the spindle being reduced, a shoulder 4 is provided which affords a bearing surface for the nut 5. The nut may be made of any suitable form, preferably so as to resemble in its general outline any ordinary form of wagon or buggy nut. It is provided with a central recess 6 which closely fits around the reduced end of the spindle, and is designed, when the end of the spindle is inserted within it, to fit snugly upon it. The nut is provided with suitable movable fastening mechanism adapted to afford means for readily fastening it to the spindle or detaching it therefrom.

Referring particularly to the fastening mechanism illustrated in the drawings, 7 indicates longitudinal apertures in the opposite sides of the nut, which extend from the outer ends of the nut and open into the recess 6. They are adapted to accommodate clips 8 which are pivoted within the aperture 7 to the nut, as indicated at 9, and are provided with outwardly-extending ears 10, through which they may be actuated by pinching them together. A bridge 11 is preferably left in the end of the nut between the apertures 7 and affords a convenient bearing for a bent spring 12 by which the clips are actuated. In operating the clips a force exerted upon their ears is necessary to overcome the resistance of this spring. The location and arrangement of the spring are immaterial, that which we regard as a convenient arrangement only being illustrated. The inner ends of the clips are urged normally toward each other by the spring 12; and their purpose and design are to engage with the aperture 3 in the end of the spindle when the parts are united and to hold the nut firmly and securely upon the end of the spindle. For this reason the clips are provided with recesses 13 and with extensions 14, which constitute engaging projections 15.

It will be observed from the drawings that the bearing edges 16 of the clips are slightly beveled. They are so designed in order that when engaged with the end of the aperture 3 in the head of the spindle they will serve to draw the nut snugly against the shoulder 4 and prevent any looseness or rattling, which otherwise might be occasioned by wear.

It is obvious that if the strain upon the nut were cast upon the pintle, the pintle would, in ordinary limits of size, be unable to withstand the pressure. For that reason we provide, near the inner ends of the clips, base-supports 17 which, in practice, bear firmly against the bases 18 of the apertures 7 and transfer the strain from the pintle to those broad bearing surfaces of the clips. The extensions 14, it will be observed by comparison of the illustration shown in Figs. 3 and 4, work in the inner ends of the apertures 7 and serve as limiting stops for the movement of the clips.

In operation the ears of the clips are pinched together, as shown in Fig. 4, so that the recess 6 is unobstructed, and the end of the spindle may be freely entered within it. Upon releasing the ears the clips close together and engage with the aperture in the end of the spindle and hold the nut firmly in place.

We do not desire to limit ourselves in any respect to the details of construction herein illustrated and described, but reserve to ourselves the right fully to modify and change them within the scope of our invention.

What we claim, broadly, is—

1. The combination with an axle having a reduced extremity and an intermediate shoulder and an aperture in the reduced end thereof, of a nut adapted to fit upon the extremity of the axle, spring actuated pivoted clips provided with beveled bearing surfaces adapted to engage with the end of the aperture upon the axle and hold the parts firmly united; substantially as set forth.

2. The combination with an axle, having a perforated end, of an axle nut provided with spring actuated pivoted clips having their ends projecting beyond the nut, in order to render them accessible, and facilitate the removal of the nut.

3. The combination of an axle, having a perforated reduced end, of an axle nut having spring actuated clips provided with beveled ends adapted to facilitate the placing of the nut upon the axle.

4. The combination with the perforated reduced end, of an axle of an axle nut having spring actuated pivoted clips, provided with beveled ends, adapted to facilitate the placing of the nut upon the axle, and having their opposite ends of sufficient length to project beyond the nut and adapted to facilitate its removal therefrom.

In testimony of all which we have hereunto subscribed our names.

WILLIE H. COLLINS.
BYRON H. COLLINS.

Witnesses:
A. O. SAFFORD,
WALTER E. WESTOVER.